United States Patent
Mori

(10) Patent No.: US 12,351,213 B2
(45) Date of Patent: Jul. 8, 2025

(54) VEHICLE CONTROL SYSTEM AND VEHICLE CONTROL METHOD

(71) Applicant: BRIDGESTONE CORPORATION, Tokyo (JP)

(72) Inventor: Ryosuke Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 267 days.

(21) Appl. No.: 18/257,291

(22) PCT Filed: Aug. 2, 2021

(86) PCT No.: PCT/JP2021/028670
§ 371 (c)(1),
(2) Date: Jun. 14, 2023

(87) PCT Pub. No.: WO2022/145082
PCT Pub. Date: Jul. 7, 2022

(65) Prior Publication Data
US 2023/0406358 A1    Dec. 21, 2023

(30) Foreign Application Priority Data
Dec. 28, 2020   (JP) ................................. 2020-219334

(51) Int. Cl.
  *B60W 60/00*   (2020.01)
  *B60W 10/04*   (2006.01)
  (Continued)

(52) U.S. Cl.
  CPC ........ *B60W 60/0025* (2020.02); *B60W 10/04* (2013.01); *B60W 10/18* (2013.01); *B60W 10/20* (2013.01)

(58) Field of Classification Search
  CPC .. B60W 60/0025; B60W 10/04; B60W 10/18; B60W 10/20
  See application file for complete search history.

(56) References Cited

U.S. PATENT DOCUMENTS

| | | | |
|---|---|---|---|
| 2017/0305209 A1* | 10/2017 | Caracino | B60C 19/002 |
| 2018/0093661 A1* | 4/2018 | Schwarz | B60W 10/04 |

(Continued)

FOREIGN PATENT DOCUMENTS

| | | |
|---|---|---|
| JP | 2013134213 A | 7/2013 |
| JP | 2020006725 A | 1/2020 |

(Continued)

OTHER PUBLICATIONS

Jul. 4, 2023, International Preliminary Report on Patentability issued in the International Patent Application No. PCT/JP2021/028670.

(Continued)

*Primary Examiner* — Hunter B Lonsberry
*Assistant Examiner* — Harrison Heflin
(74) *Attorney, Agent, or Firm* — KENJA IP LAW PC

(57) ABSTRACT

A vehicle control system 100 according to the present disclosure comprises a first battery 11 that supplies power to a power source that drives the vehicle 1; an automatic driving processing unit 13 that provides the automatic driving function; and a second battery 12. The second battery 12 supplies power to the automatic driving processing unit 13 in the ignition-off state. Further, the second battery 12 supplies power to the first battery 11 to activate the first battery 11 when the vehicle is transitioned from the ignition-off state to an ignition-on state.

9 Claims, 4 Drawing Sheets

(51) Int. Cl.
    *B60W 10/18*    (2012.01)
    *B60W 10/20*    (2006.01)

(56) References Cited

U.S. PATENT DOCUMENTS

| | | | |
|---|---|---|---|
| 2020/0114885 A1* | 4/2020 | Pursifull | B60W 30/1884 |
| 2021/0197622 A1* | 7/2021 | Okada | B60C 11/1281 |
| 2021/0272398 A1 | 9/2021 | Mori et al. | |

FOREIGN PATENT DOCUMENTS

| | | | |
|---|---|---|---|
| JP | 2020012711 A | 1/2020 | |
| JP | 2020085610 A | 6/2020 | |
| WO | 2020009163 A1 | 1/2020 | |

OTHER PUBLICATIONS

Apr. 25, 2024, search result of the Extended European Search Report issued by the European Patent Office in the corresponding European Patent Application No. 21914943.2.
Sep. 14, 2021, International Search Report issued in the International Patent Application No. PCT/JP2021/028670.

\* cited by examiner

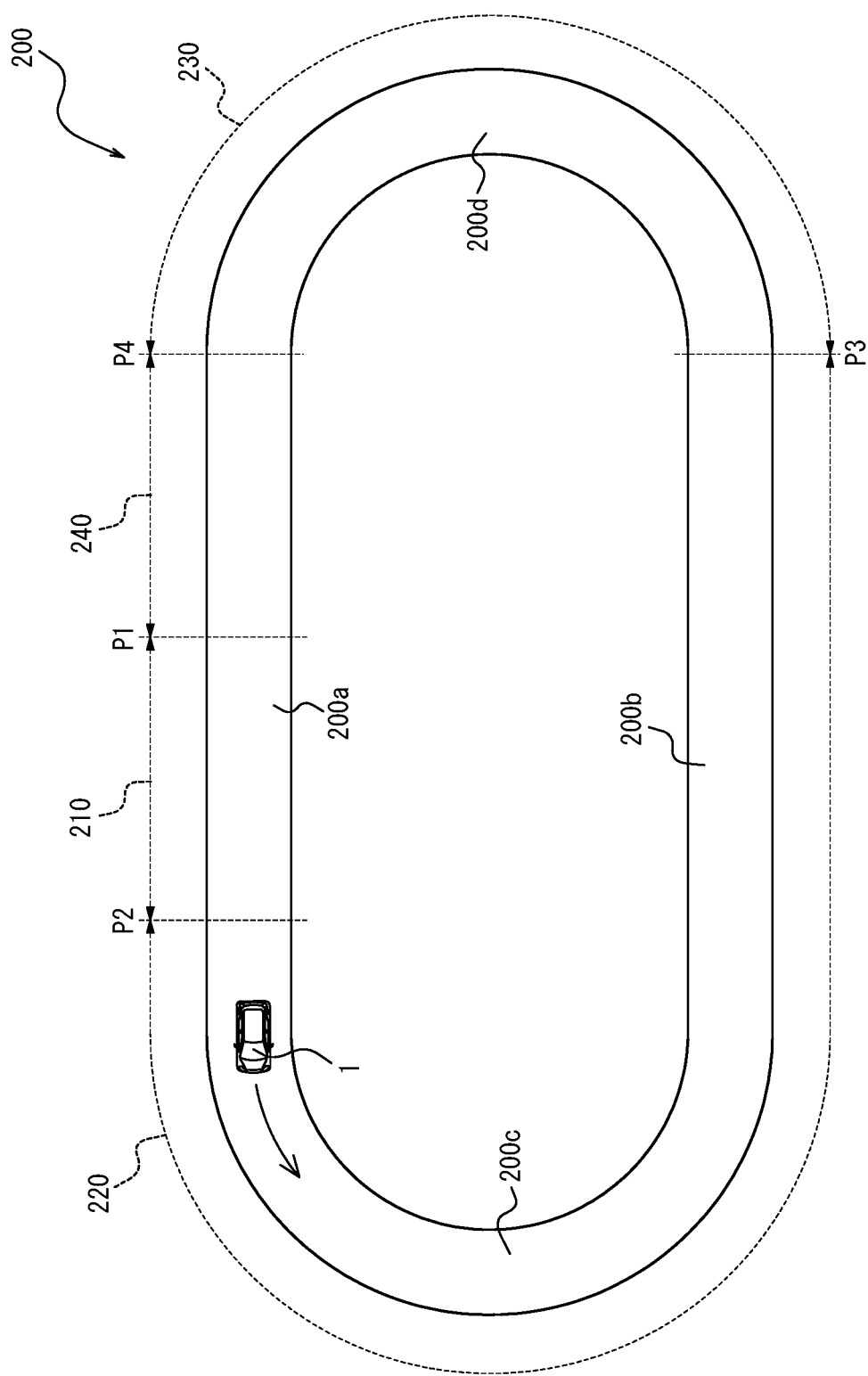

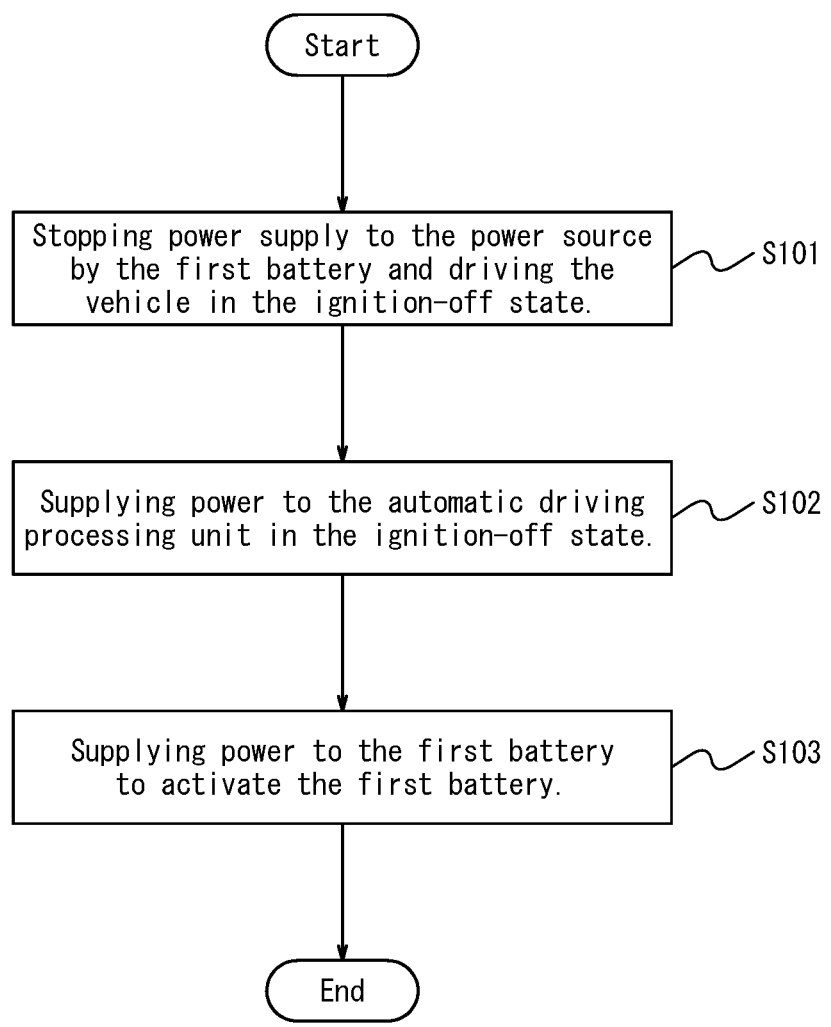

FIG. 4

| Classification | | Details | Deceleration | Limitation on number of times |
|---|---|---|---|---|
| Driving scenarios | | Entry standby to banked section | Small | No |
| | | After measurement | Middle | No |
| | | On return | Small | No |
| Course conditions | | Forward obstacle (Movement: forward direction) | Small | No |
| | | Forward obstacle (Movement: non) | Middle | Yes |
| | | Forward obstacle (Movement: perpendicular/opposite direction) | Large | Yes |
| | | Forward obstacle (In banked section) | Middle | Yes |
| | | Road surface | Middle | Yes |
| Vehicle conditions | | Abnormality detection | Middle | Yes |
| Operator instructions | | Course closure, earthquake, rainfall | Middle | Yes |

VEHICLE CONTROL SYSTEM AND VEHICLE CONTROL METHOD

TECHNICAL FIELD

This disclosure relates to a vehicle control system and a vehicle control method.

BACKGROUND

Conventionally, the bench test method and the actual vehicle test method are known as tire testing methods. The bench test method, for example, includes the way in which the pseudo surface of a drum is brought into contact with the tire and the noise emitted by the tire is measured while the drum is rotating (see PTL 1). On the other hand, in the actual vehicle test method, various tests are conducted while the vehicle is actually driven along a lap course dedicated for testing.

CITATION LIST

Patent Literature

PTL 1: 2013-134213 A

SUMMARY

Technical Problem

In recent years, in the actual vehicle tests for tires described above, the tires are mounted on vehicles equipped with automatic driving functions and the vehicles are driven around a course for testing to obtain test data. One of the tests for tires is the pass-by noise (PBN) test.

In the pass-by noise test, the noise level of running noise generated by the friction between the tires and the road surface is measured when a vehicle equipped with tires travels along a test section on the course. Therefore, in the pass-by noise test, the vehicle travels inertially through the test section with the power supply that supplies power to the engine or motor powering the vehicle turned off, hereinafter referred to as "ignition-off state", so that the drive noise of the engine or motor is not included in the running noise. As mentioned above, the tire testing involves driving the vehicle around the course. For this reason, in the pass-by noise test, after the vehicle in the ignition-off state passes through the test section, it is necessary to supply power to the power source and transition the vehicle to a state in which the power source is driven, hereinafter referred to as "ignition-on state", to drive the vehicle. Conventionally, the vehicle was transitioned from the ignition-off state to the ignition-on state by manually activating the stopped power supply, which was time-consuming.

Therefore, the purpose of the present disclosure made in view of the above problems is to provide a vehicle control system and a vehicle control method that can improve the efficiency of tire testing.

Solution to Problem

The vehicle control system in accordance with one aspect of the present disclosure is a vehicle control system that is mounted on a vehicle equipped with tires and an automatic driving function and allows the vehicle to drive automatically on a course to conduct a tire testing, wherein the vehicle control system comprises: a first power supply that supplies power to a power source that drives the vehicle; an automatic driving processing unit that provides the automatic driving function; and a second power supply; the tire testing includes driving the vehicle in an ignition-off state in which the first power supply is turned off and the power supply to the power source by the first power supply is stopped, the second power supply supplies power to the automatic driving processing unit in the ignition-off state, and supplies power to the first power supply to activate the first power supply when the vehicle is transitioned from the ignition-off state to an ignition-on state in which the first power supply supplies power to the power source.

The vehicle control method in accordance with one aspect of the present disclosure is a vehicle control method for allowing a vehicle equipped with tires and an automatic driving function to drive automatically on a course to conduct a tire testing, wherein the vehicle has a first power supply that supplies power to a power source that drives the vehicle, an automatic driving processing unit that provides the automatic driving function, and a second power supply, driving the vehicle in an ignition-off state in which the first power supply is turned off and the power supply to the power source by the first power supply is stopped, supplying power to the automatic driving processing unit by the second power supply in the ignition-off state, and activating the first power supply by supplying power to the first power supply by the second power supply when the vehicle is transitioned from the ignition-off state to an ignition-on state in which the first power supply supplies power to the power source.

Advantageous Effect

According to the present disclosure, it is possible to provide a vehicle control system and a vehicle control method that can improve the efficiency of tire testing.

BRIEF DESCRIPTION OF THE DRAWINGS

In the accompanying drawings:

FIG. 2 is a plan view of an example course on which the vehicle illustrated in FIG. 1 travels;

FIG. 3 is a flowchart illustrating an example operation of the vehicle control system illustrated in FIG. 1; and FIG. 4 illustrates an example of the control of the first braking device by the controller illustrated in FIG. 1.

DETAILED DESCRIPTION

Figure 1:
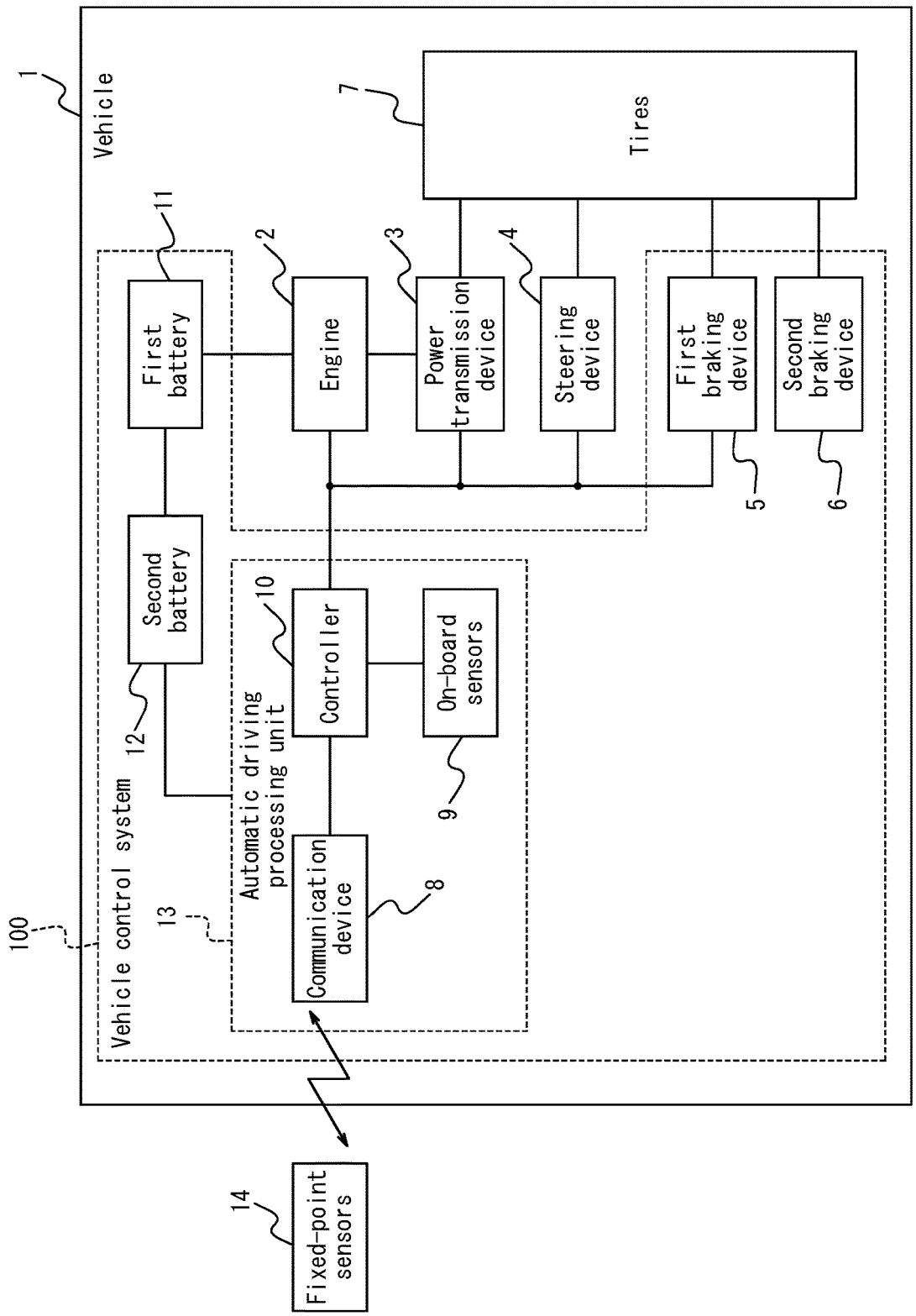
FIG. 1 is a block diagram illustrating an example configuration of a vehicle equipped with a vehicle control system according to one embodiment of this disclosure.

The following is an illustrative description of this disclosure with reference to the drawings. In each figure, identical symbols indicate the same or equivalent components.

FIG. 1 is a block diagram illustrating an example configuration of a vehicle 1 equipped with a vehicle control system 100 according to one embodiment of this disclosure. The system 100 according to this embodiment is mounted on a vehicle 1 equipped with tires 7 and controls the vehicle 1 to drive automatically on a course 200 illustrated in FIG. 2 to conduct the test of tires 7. Details of the course 200 are described below.

As illustrated in FIG. 1, vehicle 1 is equipped with an engine 2, a power transmission device 3, a steering device 4, a first braking device 5, a second braking device 6, tires 7, a communication device 8, on-board sensors 9, a controller 10, a first battery 11, and a second battery 12. The communication device 8, on-board sensors 9, and controller 10 constitute the automatic driving processing unit 13 that provides the automatic driving functions provided in the vehicle 1. The configuration of the automatic driving processing unit 13 is not limited to the configuration illustrated in FIG. 1, instead may include various configurations to provide automatic driving functions for the vehicle 1. The vehicle control system 100 according to the present disclosure may include at least a first battery 11 as a first power supply, a second battery 12 as a second power supply, and an automatic driving processing unit 13. The vehicle control system 100 may further include a first braking device 5 and a second braking device 6.

The engine 2 is the power source that drives the vehicle 1. The engine 2 is driven by the power supplied by the first battery 11. The vehicle 1 may be equipped with a motor instead of the engine 2 as a power source. The vehicle 1 may also be equipped with both of an engine 2 and a motor as a power source.

The power transmission device 3 transmits the power generated by the engine 2 to the tires 7. The power transmission device 3 includes a transmission or the like.

The steering device 4 controls the steering angle of the tires 7. The steering device 4 includes a steering wheel or the like.

The first braking device 5 brakes the tires 7. The first braking device 5 operates according to the control of the controller 10 described below. Thus, if the controller 10 does not operate, for example, because the power supply to the automatic driving processing unit 13 stops, the first braking device 5 will also stop operating.

The second braking device 6 brakes the tires 7. The second braking device 6 can operate independently of the controller 10. The second braking device 6 is driven by a different drive system than the first braking device 5. For example, the second braking device 6 injects fluid into a hydraulic actuator, which drives the actuator and mechanically presses the brake pedal to brake the tires 7.

The communication device 8 includes a communication module capable of wireless communication. The communication device 8 may include, for example, communication modules compatible with mobile communication standards such as 4G (4th Generation) and 5G (5th Generation). The communication device 8 communicates via a communication interface with the fixed-point sensors 14 located around the course 200 on which the vehicle travels. The fixed-point sensors 14 mainly detect the information on the course 200. The information on the course 200 may include information about conditions on the course 200, e.g., the presence or absence of objects such as other vehicles or obstacles. The fixed-point sensors 14 may include, for example, a 3D-LiDAR (Light Detection and Ranging) sensor that emits electromagnetic waves, such as infrared or millimeter waves, and detects the reflected waves of the electromagnetic waves reflected by surrounding objects, thereby detecting those surrounding objects and the distance to those in three dimensions. The communication device 8 receives the information on the course 200 detected by the fixed-point sensors 14 and outputs the received information on the course 200 to the controller 10.

The on-board sensors 9 mainly detect information about the vehicle 1 on which the on-board sensors 9 are mounted. The information detected by the on-board sensors 9 may include information on the status of the vehicle 1, such as the position or speed of the vehicle 1. The information detected by the on-board sensors 9 may include information on the conditions around the vehicle 1. The on-board sensors 9 may acquire the information from various meters on the vehicle 1, such as speed meters, tachometers, fuel meters, or mileage meters. The on-board sensors 9 may include GPS sensors that use a positioning system such as the Global Positioning System (GPS) to detect the position of the vehicle 1. The on-board sensors 9 may include speed sensors that use GPS to detect the speed of the vehicle 1. On-board sensors 9 may include cameras, such as monochrome or stereo cameras, that capture images of the area around the vehicle 1. The on-board sensors 9 may include LiDAR sensors. The on-board sensors 9 output the detected information on the vehicle 1 to the controller 10.

The controller 10 is one or more processors. The processor can be a general-purpose processor such as a central processing unit (CPU) or a dedicated processor specialized for a particular process. The controller 10 may include one or more dedicated circuits. One or more processors may be replaced by one or more dedicated circuits in the controller 10. For example, an FPGA (Field-Programmable Gate Array) or ASIC (Application Specific Integrated Circuit) can be used as a dedicated circuit.

The controller 10 controls the engine 2, the power transmission device 3, the steering device 4, and the first braking device 5, and thereby controls the behavior of the vehicle 1 in automatic driving. The automation levels may be, for example, Level 3-5 as defined by the SAE (Society of Automotive Engineering).

The controller 10 acquires detection results from all or some of the on-board sensors 9 and fixed-point sensors 14, and detects the position of the vehicle 1 and obstacles around the vehicle 1 based on the acquired detection results. The controller 10 controls the travel of the vehicle 1 based on the detection results regarding the position of the vehicle 1 and obstacles around the vehicle 1.

The first battery 11 is a secondary battery such as a lead-acid battery or a lithium-ion battery. The first battery 11 supplies power to the power source of the vehicle 1, the engine 2 and/or motor, to drive the engine 2. The first battery 11 stops operation, for example, when the vehicle 1 is driven inertially for the pass-by noise test described above. When the first battery 11 stops operation, the power source of the vehicle 1 stops operating and the vehicle 1 enters the ignition-off state. The first battery 11 may charge the second battery 12 if the second battery 12 is a secondary battery. The first battery 11 may supply power to the various electrical or electronic devices installed in the vehicle 1.

The second battery 12 is a secondary battery such as a lead-acid battery or a lithium-ion battery. The second battery 12 may be a primary battery. The second battery 12 supplies power to the automatic driving processing unit 13. More specifically, the second battery 12 supplies power to the automatic driving processing unit 13 in the ignition-on state as well as the ignition-off state. The second battery 12 supplies power to the automatic driving processing unit 13, allowing the automatic driving processing unit 13 to drive the vehicle 1 automatically even in the ignition-off state. The controller 10 controls at least the deceleration and steering of the vehicle 1 in the ignition-off state. Therefore, it is possible to avoid obstacles in the vicinity of the vehicle 1 even in the ignition-off state, thereby improving the safety in the testing of tires 7.

As mentioned above, in the testing of tires 7, the vehicle 1 is typically driven around a course 200. Therefore, it is necessary to transition the vehicle 1 to the ignition-on state after the predetermined measurement is made in the ignition-off state. The second battery 12 supplies power to the first battery 11 to activate the first battery 11 when the vehicle 1 is transitioned from the ignition-off state to the ignition-on state. The first battery 11, when activated by the second battery 12, powers and drives the power source of the vehicle 1, causing the vehicle 1 to transition to the ignition-on state.

Thus, in this embodiment, when the vehicle 1 is transitioned from the ignition-off state to the ignition-on state, the second battery 12 supplies power to the first battery 11 to activate the first battery 11. This allows the vehicle 1 to automatically transition from the ignition-off state to the ignition-on state, eliminating the need for the manual operations to transition the state of the vehicle 1 and improving the efficiency in the testing of tires 7.

As described above, the vehicle 1 travels automatically on the course 200 by the automatic driving function. The course 200 is, for example, a course for conducting the testing of tires 7. FIG. 2 is a plan view of an example of a course 200 on which vehicle 1 travels for the testing of tires 7.

As illustrated in FIG. 2, the course 200 is a closed circular course consisting of two straight tracks 200a, 200b extending parallel to each other, and semicircular curved tracks 200c, 200d located at both ends of the straight tracks 200a, 200b and connect the ends of both straight tracks 200a, 200b. The vehicle 1 travels around the course 200, a circular course, in a predetermined direction (leftward in FIG. 2).

The course 200 may be divided into several sections. For example, the course 200 includes a test section 210 that starts at position P1 and ends at position P2. The positions P1 and P2 are included in the straight track 200a. Therefore, the test section 210 is a straight section. The test section 210 is a section for performing various measurements related to testing the tires 7. The testing of tires 7 includes, for example, the pass-by noise test described above. The pass-by noise test is conducted in accordance with prescribed standards for tire testing, e.g., ECE R117-02, the international standard for tire noise regulation. The road surface in the test section 210 may be a road surface based on the ISO 10844 standard. As described above, in the pass-by noise test, the vehicle 1 enters the ignition-off state with the power source stopped before the test section 210 and travels inertially through the test section 210 so that the running noise of the vehicle 1 does not include the driving noise of the power source of the vehicle 1. Once the vehicle 1 has passed through the test section 210, it transitions from the ignition-off state to the ignition-on state. The fact that the vehicle 1 has passed through the test section 210 can be detected, for example, by the position information of the vehicle 1. The testing of tires 7 is not limited to the pass-by noise test, instead may be other tests.

In the case of a pass-by noise test, microphones are placed on both sides of the road surface in the width direction of the test section 210, and the vehicle 1 travels at a pre-determined speed in the center of the road surface of the test section 210. The microphones located on both sides of the road surface each detect the noise level of the running noise of the vehicle 1 while the vehicle 1 is traveling on the test section 210, and acquire the noise level as the test data for tires 7.

The course 200 further includes an adjustment section 220, a banked section 230, and an acceleration section 240.

The adjustment section 220 is a section that starts at position P2 and ends at position P3. Position P3 is the location where straight track 200b and curved track 200d are connected. The adjustment section 220 is the section including a section after the test section 210 of the straight track 220a, curved track 220c, and straight track 200b. In other words, the adjustment section 220 is the section connected to the end of the test section 210 and the beginning of the banked section 230, which is described below. In the adjustment section 220, the vehicle 1 is permitted to overtake other vehicles and the other vehicles are also permitted to overtake the vehicle 1. In the adjustment section 220, the order of vehicles entering the test section 210, etc., is adjusted.

The banked section 230 is a section that starts at position P3 and ends at position P4. The position P4 is the location where the straight track 200a and the curved track 200d are connected. The banked section 230, for example, is sloped such that the road surface is getting higher from the inner circumference to the outer circumference of the curve. That is, the banked section 230 is, for example, a section that has a curve shape, and the road surface thereof slopes from the inner circumference to the outer circumference of the curve. Due to this inclination, the vehicle 1 maintains a constant speed (e.g., 60 km/h) in the banked section 230 by driving on the outside of the semicircular corners and using centrifugal force.

In the banked section 230, the vehicle is required to maintain a relatively high speed despite the restricted field of view from the vehicle 1 due to its shape. Therefore, for safety reasons, only one car may travel on the banked section 230. Thus, while one vehicle is traveling on the banked section 230, other vehicles may be controlled to wait to enter the banked section 230, by slowing and stopping etc. in the adjustment section 220 before the banked section 230.

The acceleration section 240 is a section that starts at position P4 and ends at position P1. In other words, the acceleration section 240 is a section connected to the starting point, the position P1, of the test section 210. The distance of the acceleration section 240 is determined according to the speed required to the testing of tires 7 in the test section 210, the type of tires 7 mounted on the vehicle 1, the load of vehicle 1, and the acceleration performance of the vehicle 1. In the acceleration section 240, the controller 10 accelerates the vehicle 1 to the speed required for entry into the test section 210, for example, at a predetermined acceleration rate.

Next, the operation of the vehicle control system 100 will be described.

FIG. 3 is a flowchart illustrating an example of the operation of the vehicle control system 100 according to the present embodiment and illustrating a vehicle control method in the vehicle control system 100. In FIG. 3, a test such as a pass-by noise test in which the vehicle 1 travels in the ignition-off state and then the vehicle 1 is transitioned from the ignition-off state to the ignition-on state is described as an example.

For example, before the vehicle 1 enters the test section 210 of the course 200, the first battery 11 stops supplying power to the power source, i.e., engine 2 and/or motor, and the vehicle 1 is driven in the ignition-off state (Step S101).

The second battery 12 supplies power to the automatic driving processing unit 13 in the ignition-on state, and also supplies power to the automatic driving processing unit 13 when the vehicle 1 transitions to the ignition-off state (Step S102). This allows the automatic driving function to control the vehicle 1, e.g., decelerating and steering the vehicle 1, even in the ignition-off state.

For example, when the vehicle 1 passes through the test section 210 of course 200, the second battery 12 supplies power to the first battery 11 to activate the first battery 11 (Step S103). When activated by power from the second battery 12, the first battery 11 provides power to the power source, engine 2 and/or motor, to drive the power source. By driving the power source, the vehicle 1 automatically transitions from the ignition-off state to the ignition-on state.

The controller 10 determines whether or not the transition from the ignition-off state to the ignition-on state is required. When the controller 10 determines that the vehicle 1 has passed through the test section 210, based on the position information of the vehicle 1 obtained from the detection results of on-board sensors 9, for example, it determines that the vehicle 1 needs to transition from the ignition-off state to the ignition-on state. Then, when the controller 10 determines that the vehicle 1 needs to transition from the ignition-off state to the ignition-on state, it instructs the second battery 12 to supply power to the first battery 11. The second battery 12 supplies power to the first battery 11 in accordance with the instructions of the controller 10.

As described with reference to FIG. 3, the vehicle control method according to the present embodiment includes the steps of: stopping the first battery 11 and driving the vehicle 1 in an ignition-off state; supplying power to the automatic driving processing unit 13 by the second battery 12 in the ignition-off state; suppling power to the first battery 11 by the second battery 12 to activate the first battery 11 when the vehicle 1 is transitioned from the ignition-off state to the ignition-on state.

This allows the vehicle 1 to automatically transition from the ignition-off state to the ignition-on state, thus improving the efficiency in the testing of tires 7.

As described above, the vehicle control system 100 is equipped with a first braking device 5 and a second braking device 6 that operate according to the control of the controller 10. The controller 10 controls the first braking device 5 based on the detection results of on-board sensors 9 and fixed-point sensors 14. For example, the controller 10 determines the presence or absence of obstacles in the vicinity of vehicle 1 based on the detection results of on-board sensors 9 and fixed-point sensors 14, and if it determines that obstacles exist in the vicinity of vehicle 1, it controls the first braking device 5 and other devices to prevent the vehicle 1 from contacting the obstacles or otherwise. The control of the first braking device 5 by the controller 10 can be realized, for example, by building a control model using Artificial Intelligence (AI). The construction of the control model using AI described above is not directly related to the present invention, so a detailed explanation is omitted.

The second braking device 6 can operate independently of the control device 10 and is driven by a drive system separate from the first braking device 5. The second braking device 6 operates in response to an abnormal operation of the first braking device 5. The second braking device 6 operates to decelerate the vehicle 1 when there is an operational error in the first braking device 5, for example, when the first braking device 5 is not controlled by the controller 10 for a predetermined period of time or when a power failure occurs to the drive system of the first braking device 5. In this way, the vehicle 1 can be decelerated by the second braking device 6 even if the operation of the first braking device 5 is abnormal, thus improving the safety in the testing of tires 7.

In this way, the second braking device 6, which operates with a different drive system than the first braking device 5, allows the braking system to be multiplexed and improves the safety in the testing of tires 7.

The control of the first braking device 5 by controller 10 will now be described in more detail.

The controller 10 may control the deceleration of the vehicle 1 by the braking device 5 according to at least one of the following: a driving scenario that defines the driving path and speed of the vehicle 1 in the testing of tires 7, the conditions of course 200, and the conditions of vehicle 1.

For example, the controller 10 may control the first braking device 5 so that the vehicle 1 decelerates at one of three deceleration levels, depending on at least one of the following: a driving scenario of the vehicle 1 in the testing of tires 7, the conditions of course 200, and the conditions of vehicle 1. FIG. 4 illustrates an example of the control of the first braking device 5 by the controller 10. In FIG. 4, for example, the degree of deceleration of the vehicle 1 by the first braking device 5 is set in three levels: the "small" deceleration, the "medium" deceleration which is greater than the "small" deceleration, and the "large" deceleration which is greater than the "medium" deceleration.

The case where the driving scenario of the vehicle 1 in the testing of tires 7 requires the deceleration of the vehicle 1 includes: when the vehicle 1 waits in the adjustment section 220 to enter the banked section 230, when the vehicle 1 decelerates after a predetermined measurement is completed, or when the vehicle 1 returns to a predetermined storage location after the test is completed.

When the vehicle 1 waits in the adjustment section 220 to enter the banked section 230 and when the vehicle 1 returns to a predetermined storage location after the test is completed, there is little need to decelerate the vehicle 1 rapidly. Therefore, the controller 10 sets the deceleration level of the vehicle 1 by the first braking device 5 to the "small" deceleration. By reducing the deceleration of the vehicle 1, the load on the tires 7 can be reduced. When the vehicle 1 decelerates after completing the predetermined measurement, i.e., when the vehicle 1 has passed through the test section 210 and travels through the adjustment section 220, it is desirable to decelerate the vehicle 1 relatively quickly in order to prevent collisions with other vehicles traveling in the adjustment section 220. Therefore, the controller 10 sets the deceleration level of the vehicle 1 to the "medium" deceleration when the predetermined measurement has been completed and the vehicle is to decelerate.

The case where the conditions of the course 200 require the deceleration of the vehicle 1 includes: when there is an obstacle in front of the vehicle 1 that moves in the same direction as the vehicle 1 (forward direction); when there is a non-moving obstacle in front of the vehicle 1; when there is an obstacle in front of the vehicle 1 that moves in a direction perpendicular or opposite to the direction the vehicle 1 is travelling; when there is an obstacle in front of the vehicle 1 in the banked section 230; when the surface of the course 200 is wet, or the like.

When there is an obstacle in front of the vehicle 1 that moves in the same direction as the vehicle 1 (forward direction), the distance between the vehicle 1 and the obstacle does not decrease rapidly even if the speed of vehicle 1 is greater than that of the obstacle. Therefore, the controller 10 sets the deceleration level of the vehicle 1 to the "small" deceleration. By setting the deceleration level of the vehicle 1 to the "small" deceleration, the load on the tires 7 can be reduced. On the other hand, when there is an obstacle in front of the vehicle 1 that moves in a direction perpendicular or opposite to the direction the vehicle 1 is travelling, the distance between the vehicle 1 and the obstacle will rapidly decrease. Therefore, the controller 10 sets the deceleration level of the vehicle 1 to the "large" deceleration. By setting the deceleration level of the vehicle 1 to the "large" deceleration, the possibility of the vehicle 1 colliding with the forward obstacle can be reduced, although the load on the tires 7 will be greater. When there is a non-moving obstacle in front of the vehicle 1, the distance between the vehicle 1 and the obstacle is less likely to decrease than in a case when the obstacle moves in a direction opposite to the direction the vehicle 1 is traveling. Therefore, the controller 10 sets the deceleration level of the vehicle 1 to the "middle" deceleration. When there is an obstacle in front of the vehicle 1 in the banked section 230, and when the course 200 is wet, although it is not necessary to stop the vehicle 1 urgently, it is preferable for safety reasons to decelerate the vehicle 1 relatively quickly. Therefore, the controller 10 sets the deceleration level of the vehicle 1 to the "middle" deceleration.

The case where the conditions of the vehicle 1 require the deceleration of the vehicle 1 includes: when an abnormality which may impair the automatic driving function is detected in the vehicle 1, for example, failure of on-board sensors 9, communication failure of communication device 8, flat tire 7, etc., even if the vehicle 1 can be driven automatically. In this case, although it is not necessary to stop the vehicle 1 urgently, it is preferable for safety reasons to decelerate the vehicle 1 relatively quickly. Therefore, the controller 10 sets the deceleration level of the vehicle 1 to the "middle" deceleration.

In addition, the controller 10 may also control the deceleration of the vehicle 1 by the first braking device 5 based on the operator's instructions for the testing of tires 7. For example, if the operator indicates that the test should be stopped due to the closure of course 200, the occurrence of an earthquake, or rainfall, etc. the controller 10 will stop the vehicle 1. In this case, although the controller 10 does not need to stop the vehicle 1 urgently, it is preferable for safety reasons to decelerate the vehicle 1 relatively quickly. Therefore, the controller 10 sets the deceleration level of the vehicle 1 to the "middle" deceleration.

In this way, by controlling the degree of deceleration of the vehicle 1 by the first braking device 5 according to at least one of: the driving scenario of the vehicle 1, the condition of the course 200, and the condition of the vehicle 1 in testing the tires 7, the vehicle 1 can be decelerated according to urgency while considering the load of the tires 7. This makes it possible to improve the safety in the testing of tires 7 and reduce the load on the tires 7.

Also, the controller 10 may set a limit on the number of times the first braking device 5 can cause the vehicle 1 to decelerate in each case described above and may stop the testing of the tires 7 if the deceleration of the vehicle 1 by the first braking device 5 occurs more than a set number of times. In other words, the controller 10 may stop the testing of tires 7 if the vehicle 1 decelerates more than a predetermined number of times under predetermined conditions.

In the example illustrated in FIG. 4, if any of the following cases arise, it may be undesirable to continue the testing of tires 7 due to safety concerns and the increased load on the tires 7: the presence of non-moving obstacle in front of the vehicle 1, the presence of obstacle in front of the vehicle 1 that moves in a direction perpendicular or opposite to the direction the vehicle 1 is travelling, the presence of obstacle in the banked section 230, the wet road surface of the course 200, the detection of abnormalities in the vehicle 1, and the deceleration of the vehicle 1 by the operator's instructions more than a predetermined number of times. Therefore, the controller 10 stops the testing of tires 7 when the deceleration of the vehicle 1 by the first braking device 5 occurs more than a predetermined number of times under predetermined conditions, that is each condition described above. In this way, the testing of tires 7 can be stopped under conditions where it is not desirable to continue the testing, thus improving the safety in the testing of tires 7 and ensuring the reliability of the test measurement results.

As described above, the vehicle control system 100 in this embodiment comprises a first battery 11 that supplies power to the power source, the engine 2 and/or motor, of the vehicle 1, an automatic driving processing unit 13 that provides the automatic driving functions, and a second battery 12. The second battery 12 supplies power to the automatic driving processing unit 13 in the ignition-off state. The second battery 12 also supplies power to the first battery 11 to activate the first battery 11 when the vehicle 1 is transitioned from the ignition-off state to the ignition-on state.

The vehicle control method according to this embodiment has the following steps: turning off the first battery 11 and driving the vehicle 1 in an ignition-off state; supplying power to the automatic driving processing unit 13 by the second battery 12 in the ignition-off state; activating the first battery 11 by supplying power to the first battery 11 by the second battery 12 when the vehicle 1 is transitioned from the ignition-off state to the ignition-on state.

As a result, the vehicle 1 can be automatically transitioned from the ignition-off state to the ignition-on state, which eliminates the need for manual operation and improves the efficiency in the testing of tires 7.

The vehicle control system 100 and the vehicle control method of the present disclosure are not limited to the specific configurations illustrated in the embodiments described above, and various variations and changes are possible without departing from the scope of the claims.

REFERENCE SIGNS LIST

1: Vehicle
2: Engine (Power source)
3: Power transmission device
4: Steering device
5: First braking device
6: Second braking device
7: Tires
8: Communication device
9: On-board sensors
10: Controller
11: First battery (First power supply)
12: Second battery (Second power supply)
13: Automatic driving processing unit
14: Fixed-point sensors
100: Vehicle control system
200: Course
200a, 200b: Straight track
200c, 200d: Curved track
210: Test section
220: Adjustment section
230: Banked section
240: Acceleration section

The invention claimed is:

1. A vehicle control system that is mounted on a vehicle equipped with tires and an automatic driving function and allows said vehicle to drive automatically on a course to conduct a tire testing, wherein
said vehicle control system comprises:
a first power supply that supplies power to a power source that drives said vehicle;
an automatic driving processing unit that provides said automatic driving function; and
a second power supply;
said tire testing includes driving said vehicle in an ignition-off state in which said first power supply is turned off and the power supply to said power source by said first power supply is stopped, said second power supply supplies power to said automatic driving processing unit in said ignition-off state, and supplies power to said first power supply to activate said first power supply when said vehicle is transitioned from said ignition-off state to an ignition-on state in which said first power supply supplies power to said power source.

2. The vehicle control system according to claim 1, wherein
said automatic driving processing unit is provided with a controller that controls the behavior of said vehicle,
said controller controls at least the deceleration and steering of said vehicle in said ignition-off state.

3. The vehicle control system according to claim 2, further comprising
a first braking device that operates in accordance with the control of said controller and brakes said tires,
a second braking device that operates with a different drive system than said first braking device and brakes said tires.

4. The vehicle control system according to claim 3, wherein
said second braking device operates in response to an abnormal operation of said first braking device.

5. The vehicle control system according to claim 4, wherein
said controller controls the deceleration of said vehicle by said first braking device according to at least one of the following: the driving scenario of said vehicle, the conditions of said course, and the conditions of said vehicle in said tire testing.

6. The vehicle control system according to claim 5, wherein
said controller stops said tire testing when said vehicle has decelerated more than a predetermined number of times under predetermined conditions.

7. The vehicle control system according to claim 3, wherein
said controller controls the deceleration of said vehicle by said first braking device according to at least one of the following: the driving scenario of said vehicle, the conditions of said course, and the conditions of said vehicle in said tire testing.

8. The vehicle control system according to claim 7, wherein
said controller stops said tire testing when said vehicle has decelerated more than a predetermined number of times under predetermined conditions.

9. A vehicle control method for allowing a vehicle equipped with tires and an automatic driving function to drive automatically on a course to conduct a tire testing, wherein
said vehicle has a first power supply that supplies power to a power source that drives said vehicle, an automatic driving processing unit that provides said automatic driving function, and a second power supply,
driving said vehicle in an ignition-off state in which said first power supply is turned off and the power supply to said power source by said first power supply is stopped,
supplying power to said automatic driving processing unit by said second power supply in said ignition-off state, and
activating said first power supply by supplying power to said first power supply by said second power supply when said vehicle is transitioned from said ignition-off state to an ignition-on state in which said first power supply supplies power to said power source.

* * * * *